United States Patent [19]

Jones

[11] Patent Number: 5,046,573

[45] Date of Patent: Sep. 10, 1991

[54] AUTOMOTIVE POWER STEERING SYSTEM

[75] Inventor: Dennis J. Jones, Saginaw, Mich.

[73] Assignee: General Motors Corporation, Detroit, Mich.

[21] Appl. No.: 539,947

[22] Filed: Jun. 18, 1990

[51] Int. Cl.⁵ .............................................. B62D 5/083
[52] U.S. Cl. .................................. 180/143; 180/149; 91/375 A
[58] Field of Search ............. 91/375 A; 180/132, 141, 180/142, 143, 149

[56] References Cited

U.S. PATENT DOCUMENTS

| | | | |
|---|---|---|---|
| 3,787,136 | 1/1974 | Steiner | 192/56 R |
| 4,034,825 | 7/1977 | Adams | 91/375 A |
| 4,759,420 | 7/1988 | Schipper, Jr. et al. | 180/143 |

FOREIGN PATENT DOCUMENTS

| | | | |
|---|---|---|---|
| 60-137673 | 9/1985 | Japan . | |
| 61-48872 | 4/1986 | Japan . | |
| 61-155065 | 7/1986 | Japan . | |
| 0159687 | 10/1985 | United Kingdom | 180/142 |

Primary Examiner—Richard A. Bertsch
Assistant Examiner—Victor E. Johnson
Attorney, Agent, or Firm—Saul Schwartz

[57] ABSTRACT

An automotive power steering system including a power steering gear with detent reaction and a control system for the detent reaction. The detent reaction includes an annular collar in a detent pressure chamber, radially shiftable detent balls on a pinion head of the steering gear, and detent grooves in a stub shaft of the steering gear. A tension spring biases the collar to a retracted position away from the detent balls and detent pressure in the pressure chamber urges the collar toward the detent balls for detent reaction. The control system includes a detent pressure valve connecting the detent pressure chamber to a power steering pump between the pump and a rotary control valve of the steering gear. In a low vehicle speed range, the detent pressure valve exhausts the detent pressure chamber so that the detent balls are unloaded. In an intermediate speed range and a high speed range, the detent pressure valve communicates open-center backpressure to the detent pressure chamber to move the annular collar against the detent balls for detent reaction.

5 Claims, 1 Drawing Sheet

AUTOMOTIVE POWER STEERING SYSTEM

FIELD OF THE INVENTION

This invention relates to variable effort automotive power steering systems.

BACKGROUND OF THE INVENTION

In typical automotive power steering gears, a threshold manual effort level required to initiate power assist and the relationship between power assist and manual steering effort above the threshold effort are determined by a resilient element such as a torsion bar disposed between an input shaft of the steering gear and an output shaft of the steering gear. When a driver turns a steering wheel connected to the input shaft, the torsion bar twists and relative angular displacement is effected between a valve spool connected to the input shaft and a valve sleeve connected to the output shaft. The relative movement of the valve elements ports pump boost pressure to a steering assist fluid motor. With these typical power steering gears, comfortable low speed steering is assured because the spring rate of the torsion bar is relatively low and because power assist increases exponentially after the threshold effort level is achieved.

Power steering gears have been proposed in which the threshold manual effort increases with increasing vehicle speed. For example, U.S. Pat. No. 4,765,427, issued Aug. 23, 1988 and assigned to the assignee of this invention, describes a detent reaction power steering gear wherein a detent element on the output shaft penetrates a detent groove in the input shaft with a force which depends on a fluid detent pressure behind the detent element. A transmission driven pump provides detent pressure proportional to vehicle speed so that the detent elements more forcefully resist the onset of relative angular displacement between the input and output shafts and, consequently, between the valve elements as vehicle speed increases.

Power steering gears have also been proposed in which the relationship between power assist and manual effort is more linear. For example, U.S. Pat. No. 4,768,604, issued Sept. 6, 1988 and assigned to the assignee of this invention, describes a steering system wherein high pressure fluid is bypassed from the high pressure side of a steering assist fluid motor to the low pressure side to reduce assist.

A power steering system according to this invention includes a relatively simple power steering gear having detent reaction and a control system for the detent reaction whereby a comfortably low threshold manual effort level is achieved at low speed, threshold manual effort increases with increasing vehicle speed above low speed, and the relationship between power assist and manual effort above the threshold effort is more linear.

SUMMARY OF THE INVENTION

This invention is a new and improved automotive power steering system including a power steering gear with detent reaction and a detent reaction control system. The power steering gear includes a housing having a cylindrical valve chamber, a rotary control valve spool in the valve chamber connected to a stub shaft of the steering gear, a rotary control valve sleeve in the valve chamber around the spool and connected to a pinion head of the steering gear, and a torsion bar between the stub shaft and the pinion head. The pinion head has an annular flange with a seal against the wall of the valve chamber and a tubular sleeve adjacent the flange and extending toward the valve sleeve. The tubular sleeve has a plurality of radial sockets in which are disposed respective ones of a plurality of detent balls. A stem of the valve spool extends into the tubular sleeve and has a plurality of detent grooves which are penetrated by corresponding ones of the detent balls. A collar is slidably disposed on the tubular sleeve and cooperates with the tubular sleeve, the flange and the wall of the valve chamber in defining an annular detent pressure chamber. A tension spring in the detent pressure chamber biases the collar to a retracted position away from the valve sleeve and the detent balls. The control system for the detent reaction includes a solenoid operated detent pressure valve which exhausts the detent pressure chamber at low vehicle speed so that the detent balls are ineffective to resist relative angular displacement between the stub shaft and pinion head. At speeds above low speed, the detent pressure valve connects the detent pressure chamber to the pump discharge between the pump and the rotary valve so that open-center backpressure and boost pressure are communicated to the detent pressure chamber to urge a wedge on the collar against the detent balls.

BRIEF DESCRIPTION OF THE DRAWING

The single drawing FIGURE is a schematic diagram of an automotive power steering system according to this invention with a power steering gear thereof shown in longitudinal sectional view.

DESCRIPTION OF THE PREFERRED EMBODIMENT

Figure 1:
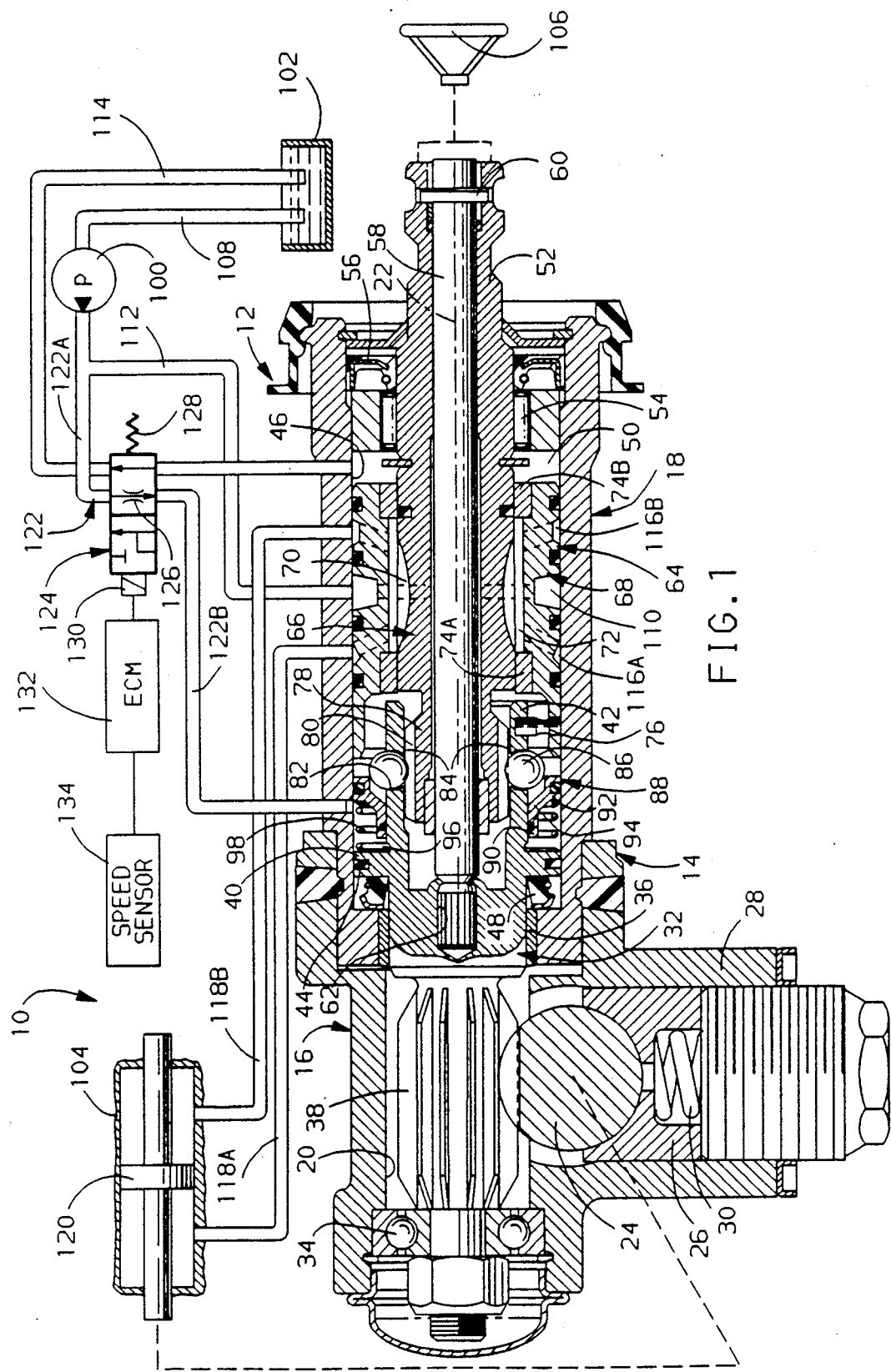

Referring to FIG. 1, an automotive power steering system 10 according to this invention includes a power steering gear 12. The power steering gear 12 has a housing 14 including a pinion housing portion 16 and a valve housing portion 18. The pinion housing portion has a generally cylindrical pinion bore 20 therein on a longitudinal centerline 22 of the housing 14. A steering rack 24 is supported on the pinion housing portion 16 for transverse bodily shiftable movement relative to the centerline 22. A slide bearing 26 in a boss 28 of the pinion housing portion 16 is biased by a spring 30 against the steering rack 24.

An output shaft or pinion head 32 of the steering gear 12 is supported in the pinion housing portion 16 for rotation about the centerline 22 by a ball bearing 34 and by a journal bearing 36. The pinion head has a pinion gear 38 thereon which meshes with rack teeth, not shown, on the steering rack 24 on the other side of the rack from the slide bearing 26. Rotation of the pinion head 32 is accompanied by concurrent bodily shiftable movement of the steering rack.

The pinion head includes an annular flange 40 and an integral tubular sleeve 42 perpendicular to the plane of the flange and aligned on the centerline 22. A seal ring 44 on the flange 40 bears against an inside wall 46 of the valve housing portion 18 and defines a fluid seal between the wall and the flange. A secondary fluid seal 48 is disposed behind the flange 40.

The inside wall 46 of the valve housing portion 18 defines a wall of a cylindrical valve chamber 50 of the steering gear. A tubular input or stub shaft 52 of the steering gear 12 projects into the valve chamber and is supported by a bearing 54 near the outboard or right end of the valve housing portion 18 for rotation about the centerline 22 independent of the pinion head 32. A seal 56 around the stub shaft prevents fluid leakage and internal contamination.

The stub shaft 52 is connected to the pinion head 32 by a torsion bar 58 disposed inside the stub shaft. An outboard end of the torsion bar is connected to the stub shaft 52 by a pin 60 for rotation as a unit therewith. An inboard end of the torsion bar is press fitted into a bore 62 in the pinion head 32 inside the tubular sleeve 42 and is rotatable as a unit with the pinion head.

An open-center rotary control valve 64 of the steering gear 12 is disposed in the valve chamber 50 in axially spaced relation to the annular flange 40 on the pinion head 32. The rotary valve is conventional and may be as described in U.S. Pat. No. 3,022,772, issued Feb. 27, 1962 to Zeigler et al and assigned to the assignee of this invention. Generally, the valve 64 includes a valve spool 66 formed integrally with the stub shaft 52 on an outside surface thereof and a valve sleeve 68 surrounding the spool.

The valve spool 66 includes a plurality of arc-shaped slots 70 in the stub shaft which face outwardly toward a corresponding plurality of grooves 72 in the valve sleeve 68 between a pair of rings 74A-B on the sleeve. In addition to closing the ends of some of the grooves 72, the rings 74A-B also journal the valve sleeve on the stub shaft for independent rotation relative thereto about the centerline 22. A radially directed pin 76 rigidly attached to the tubular sleeve 42 on the pinion head 32 is closely received in a hole in a portion of the valve sleeve 68 overlapping the tubular sleeve so that the pinion head and valve sleeve are rotatable as a unit about the centerline 22.

The inboard end of the stub shaft 52 defines a tubular stem 78 integral with the valve spool 66. The stem projects into the tubular sleeve 42 on the pinion head 32 and has a plurality of generally V-shaped detent grooves 80 therein extending axially from the inboard end of the stub shaft toward the valve spool. The tubular sleeve 42 may have internal spline-like teeth, not shown, loosely received in corresponding ones of the detent grooves 80 to define a positive connection between the stub shaft and pinion head after a predetermined amount of torsion bar twist.

A plurality of circular, radially oriented sockets 82 are formed in the tubular sleeve 42 around the stem 78. Respective ones of a plurality of lips 84 integral with the tubular sleeve are formed around the radially inner edges of respective ones of the sockets 82. Respective ones of a plurality of detent elements or balls 86 are disposed in the sockets 82 for radial bodily shiftable movement relative to the centerline 22. Clearance between the detent balls and the sockets minimizes resistance to radial bodily shiftable movement of the balls. The diameters of the lips 84 are smaller than the diameters of the detent balls to foreclose radially inward dislodgment of the detent balls from the sockets 82.

An annular collar 88 of the steering gear 12 is disposed around the tubular sleeve 42 between the annular flange 40 on the pinion head and the valve sleeve 68. The collar 88 includes a tubular skirt 90 closely received on and slidable relative to the tubular sleeve 42, an annular boss 92, and a frustoconical wedge 94 between the boss and the skirt. A seal ring on the boss 92 defines a fluid seal between the annular boss and the inside wall 46 of the valve housing portion 18. The collar 88 cooperates with the annular flange 40 and the tubular sleeve 42 on the pinion head and with the inside wall 46 of the valve housing portion 18 in defining an annular, variable volume detent pressure chamber 96. A tension spring 98 in the pressure chamber 96 biases the collar to a retracted position, shown in the drawing, wherein the wedge 94 is separated from the detent balls 86.

The pinion head 32, stub shaft 52 and rotary valve 64 are subassembled prior to installation in the housing 14. First, the spring 98 and collar 88 are installed over the tubular sleeve 42. The spring may conveniently be attached to the collar and to the pinion head by hooks or the like, not shown, on the collar and the pinion head. The collar 88 is pushed toward the flange 40 to expose the sockets for insertion of the detent balls. Thereafter, the spring 98 locates the collar 88 in its retracted position capturing the detent balls.

The valve sleeve 68 is then connected to the pin 76 on the tubular sleeve, the inboard end of the torsion bar 58 is pressed into the bore 62 in the pinion head, and the stub shaft 52 is mated with the pinion head by inserting the stem 78 into the tubular sleeve 42. The detent balls 86 are aligned with respective ones of the detent grooves 80 but do not interfere with penetration of the stem into the tubular sleeve.

The steering system 10 further includes a conventional power steering pump 100, a fluid reservoir 102, a steering assist fluid motor 104 connected to the steering rack 24, and a driver's steering wheel 106 connected to the stub shaft 52 for rotation as a unit therewith. The pump draws fluid from the reservoir through an intake 108 and discharges fluid at substantially constant flow rate to a center groove 110 around the valve sleeve 68 in the valve chamber 50 through a discharge 112. A return 114 conducts fluid from the valve chamber 50 back to the reservoir 102.

A pair fluid motor grooves 116A-B around the valve sleeve 68 on opposite sides of the center groove 110 are connected through respective ones of a pair of ducts 118A-B to a pair of working chambers of the fluid motor 104 on opposite sides of a piston 120 of the fluid motor. As described in the aforesaid U.S. Pat. No. 3,022,772, the grooves and slots 72,70 in the rotary valve port pump discharge pressure or boost pressure to one of the ducts 118A-B and port the low pressure interior of the valve chamber 50 to the other of the ducts 118A-B in accordance with relative angular displacement between the stub shaft 52 and the pinion head 32. A pressure difference thus established across the piston 120 provides steering power assist. Low pressure return flow in the valve chamber 50 circulates to the reservoir through return 114.

The power steering system 10 further includes a detent pressure branch 122 between the detent pressure chamber 96 and the pump discharge 112. A detent pressure valve 124 is interposed in the return 114 and in the detent pressure branch 122 and divides the latter into an upstream portion 122A between the detent pressure valve 124 and the discharge 112 and a downstream portion 122B between the detent pressure valve and the detent pressure chamber 96. The detent pressure valve 124 has a first position, shown in the drawing FIGURE, in which a variable orifice 126 is interposed in the detent pressure branch 122 and in which the return 114 is open directly to the reservoir 102. The detent pressure valve 124 has a second position, not shown, in which the upstream portion 122A of the detent pressure branch is blocked and in which the downstream portion 122B is connected to the return 114 for direct exhaust to the reservoir 102.

A spring 128 biases the detent pressure valve to its first position. A solenoid 130 actuates the detent pressure valve between its first and second positions and also controls the size of the variable orifice 126 in accordance with a schedule related to vehicle speed and established by an electronic control module (ECM) 132 connected to the solenoid 130 and to a vehicle speed sensor 134.

In a low vehicle speed range below about 5 MPH, the ECM maintains the detent pressure valve 124 in its second position blocking the upstream portion 122A of the detent pressure branch 122 and exhausting the detent pressure chamber 96 directly to the reservoir 102. In a higher intermediate vehicle speed range corresponding to normal city driving, the ECM actuates the detent pressure valve 124 to its first position and controls the size of the variable orifice 126 from minimum at the lowest speed of the intermediate speed range to maximum at the highest speed in the intermediate speed range. In a still higher high vehicle speed range corresponding to highway driving, the ECM actuates the solenoid 130 to maintain the detent pressure valve 124 in its first position and the variable orifice 126 at its maximum size.

The steering gear 12 and the steering system 10 operate as follows. In the low speed range, the detent pressure valve is always in its second position, the upstream portion 122A of the detent pressure branch 122 is blocked, and the detent pressure chamber 96 is exhausted directly to the reservoir 102. With substantially no pressure difference across the collar 88, the spring 98 maintain the collar 88 in its retracted position wherein the wedge 94 does not exert force on the detent balls 86. In that condition, relative angular displacement between the stub shaft 52 and the pinion head 32 is resisted only by the torsion bar. Accordingly, a low speed threshold manual effort level necessary to initiate power assist is determined by the spring rate of the torsion bar 58 as in conventional power steering gears such as described in the aforesaid U.S. Pat. 3,022,772. After the low speed threshold manual effort level is achieved, the additional manual effort required to steer the vehicle by sustaining or increasing the relative angular displacement between the stub shaft and the pinion head does not significantly increase because boost pressure increases exponentially with increasing relative angular displacement.

In the intermediate speed range, the solenoid 130 actuates the detent pressure valve 124 to its first position interposing the variable orifice 126 in the detent pressure branch 122 and directly exhausting the valve chamber 50 to the reservoir 102. In addition, in the intermediate speed range, the solenoid controls the size of the variable orifice 126 from minimum at the lowest speed in the range to maximum at the highest speed in the range. The intermediate speed threshold manual effort level, then, required to initiate power assist is higher than the low speed threshold manual effort level because a fraction of open-center backpressure in the pump discharge 112, modulated in proportion to vehicle speed by the detent pressure valve 124, is communicated to the detent pressure chamber 96.

More particularly, when the rotary valve 64 is open-center, fluid circulates from the pump 100 to the reservoir 102 across orifices defined between the edges of the slots 70 and grooves 72. Even when fully open, the orifices restrict the flow from the pump to the reservoir enough to induce an open-center backpressure or pressure increase in the pump discharge 112 relative to the return 114 and the valve chamber 50. The backpressure, modulated by detent pressure valve 124 according to vehicle speed in the intermediate speed range, is communicated to the detent pressure chamber 96 through the detent pressure branch 122 and reacts against the collar 88. The collar 88 is shifted away from its retracted position toward the outboard end of the tubular sleeve 42 until the wedge 94 engages the detent balls 86. The wedge urges the detent balls radially inward into the detent grooves 80 with a force proportional to the modulated backpressure in the detent pressure chamber 96. The detent balls resist relative angular displacement between the stem 78 and the tubular sleeve 42 in proportion to the force exerted on the balls by the wedge 94. The intermediate speed threshold manual effort level, therefore, depends upon the pressure in the detent pressure chamber 96 and increases with speed from minimum to maximum as vehicle speed increases from minimum to maximum in the intermediate speed range.

After the intermediate speed threshold manual effort level is achieved, the relationship between manual effort and power assist is more linear than in the low speed range. For example, as soon as the intermediate speed threshold manual effort level is achieved and boost pressure develops in the pump discharge 112, a fraction of boost pressure modulated according to speed by the detent pressure valve 124, is communicated by the detent pressure branch 122 to the detent pressure chamber 96 for reaction against the collar 88. The additional pressure in the detent pressure chamber 96 causes wedge 94 to more forcefully urge the detent balls 86 into the detent grooves 80 so that the detent balls more forcefully resist continued and/or increased relative angular displacement between the input and output shafts. Above the intermediate speed threshold manual effort level, then, the relationship between power assist and manual effort is more linear than in the low speed range because a driver must exert more manual to achieve the same level of power assist.

In the high speed range, the solenoid 130 maintains the detent pressure valve 124 in its first position and the variable orifice at its maximum size. The high speed threshold manual effort level required to initiate power assist by initiating relative angular displacement between the stub shaft and the pinion head is about the same as at the highest speed in the intermediate speed range. After the high speed threshold manual effort level is achieved, maximum linearity between manual effort and power assist is achieved because substantially unreduced or unmodulated boost pressure is communicated directly to detent pressure chamber 96 for reaction against the annular collar 88.

The embodiments of the invention in which an exclusive property or privilege is claimed are defined as follows:

1. An automotive power steering system comprising:
   a power steering pump,
   a fluid reservoir,
   a power steering gear having a housing with a valve chamber therein,
   a discharge between said pump and said valve chamber for conducting fluid from said pump to said valve chamber, a return between said valve chamber and said reservoir for conducting fluid from said valve chamber to said reservoir, a rotary control valve in said valve chamber including a spool rotatable as a unit with an input shaft of said steering gear and a sleeve around said spool rotatable as a unit with an output shaft of said steering gear and a torsion bar between said input and said output shafts biasing said rotary control valve to an open-center condition wherein the pressure in said discharge at the connection thereof to said valve chamber in said open-center condition of said rotary control valve exceeds the pressure in said return at the connection thereof to said valve chamber by an open-center backpressure, a detent reaction means in said housing including a variable volume detent pressure chamber, an annular collar defining a wall of said detent pressure chamber movable in a first direction from a retracted position and detent means engagable by said annular collar when said annular collar moves in said first direction and operative upon such engagement to increase resistance to relative angular displacement between said input and said output shafts, spring means biasing said annular collar in a second direction opposite said first direction toward said retracted position, a detent pressure branch having a first end connected to said discharge between said pump and said valve chamber and exposed to said open-center backpressure in said open-center condition of said rotary control valve and a second end connected to said detent pressure chamber so that said open-center backpressure is the source of fluid pressure for said detent pressure chamber in said open-center condition of said rotary control valve, and a detent pressure valve means connected to said detent pressure branch and to said return having a first position in a low vehicle speed range blocking said detent pressure branch and connecting said detent pressure chamber to said return so that said spring means moves said collar to said retracted position and a second position at vehicle speeds above said low speed range connecting said discharge to said detent pressure chamber so that at least a fraction of said open center backpressure reacts against said annular collar and moves said collar in said first direction away from said retracted position.

2. The power steering system recited in claim 1 and further including
means in said detent pressure valve means defining a variable orifice in said detent pressure branch when said detent pressure valve means is in said first position thereof, and
means for actuating said variable orifice between a maximum size and a minimum size as a function of vehicle speed in a vehicle intermediate speed range between said low vehicle speed range and a high vehicle speed range.

3. The power steering system recited in claim 1 wherein said spring means biasing said annular collar to said retracted position is a tension spring disposed in said detent pressure chamber.

4. The power steering system recited in claim 2 wherein said detent reaction means further includes
a tubular sleeve connected to one of said input shaft and said output shaft for rotation as a unit therewith,
a stem on said other of said input shaft and said output shaft for rotation as a unit therewith and extending into said tubular sleeve,
a plurality of radial sockets in said tubular sleeve,
a plurality of detent grooves in said stem,
a plurality of detent balls disposed in respective ones of said sockets for radial bodily shiftable movement toward and away from said detent grooves, and
means defining a wedge on said annular collar engageable on said detent balls when said annular collar moves in said first direction and urging said detent balls into said detent grooves.

5. The power steering system recited in claim 4 wherein said tubular sleeve is rigidly connected to said output shaft and said stem is rigidly connected to said input shaft.

* * * * *